(12) United States Patent
Miyoshi et al.

(10) Patent No.: US 11,398,328 B2
(45) Date of Patent: Jul. 26, 2022

(54) SINTERED MNZN FERRITE BODY

(71) Applicant: HITACHI METALS, LTD., Tokyo (JP)

(72) Inventors: Yasuharu Miyoshi, Tokyo (JP); Tomoyuki Tada, Tokyo (JP); Norikazu Koyuhara, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 499 days.

(21) Appl. No.: 16/496,621

(22) PCT Filed: Mar. 27, 2018

(86) PCT No.: PCT/JP2018/012288
§ 371 (c)(1),
(2) Date: Sep. 23, 2019

(87) PCT Pub. No.: WO2018/181242
PCT Pub. Date: Oct. 4, 2018

(65) Prior Publication Data
US 2020/0373047 A1      Nov. 26, 2020

(30) Foreign Application Priority Data

Mar. 28, 2017   (JP) .............................. JP2017-062811

(51) Int. Cl.
| | |
|---|---|
| *H01F 1/34* | (2006.01) |
| *C04B 35/26* | (2006.01) |
| *C04B 35/626* | (2006.01) |
| *C04B 35/634* | (2006.01) |
| *C04B 35/64* | (2006.01) |

(52) U.S. Cl.
CPC ......... *H01F 1/344* (2013.01); *C04B 35/2658* (2013.01); *C04B 35/6262* (2013.01); *C04B 35/62655* (2013.01); *C04B 35/63416* (2013.01); *C04B 35/64* (2013.01); *C04B 2235/3208*

(Continued)

(58) Field of Classification Search
CPC ............... H01F 1/344; C04B 335/2658; C04B 2235/3244; C04B 2235/3208;
(Continued)

(56) References Cited

U.S. PATENT DOCUMENTS

| | | | |
|---|---|---|---|
| 7,790,053 B2 * | 9/2010 | Ishiwaki | .................. H01F 3/08 252/62.62 |
| 10,919,809 B2 * | 2/2021 | Miyoshi | ............. C04B 35/2658 |

(Continued)

FOREIGN PATENT DOCUMENTS

| | | |
|---|---|---|
| CN | 105683125 A | 6/2016 |
| JP | 05-198416 A | 8/1993 |

(Continued)

OTHER PUBLICATIONS

International Search Report of PCT/JP2018/012288 dated Jun. 12, 2018.

(Continued)

*Primary Examiner* — C Melissa Koslow
(74) *Attorney, Agent, or Firm* — Sughrue Mion, PLLC

(57) ABSTRACT

A sintered MnZn ferrite body containing main components comprising 53.30-53.80% by mol of Fe calculated as $Fe_2O_3$, 6.90-9.50% by mol Zn calculated as ZnO, and the balance of Mn calculated as MnO, and sub-components comprising 0.003-0.020 parts by mass of Si calculated as $SiO_2$, more than 0 parts and 0.35 parts or less by mass of Ca calculated as $CaCO_3$, 0.30-0.50 parts by mass of Co calculated as $Co_3O_4$, 0.03-0.10 parts by mass of Zr calculated as $ZrO_2$, and 0-0.05 parts by mass of Ta calculated as $Ta_2O_5$, pre 100 parts by mass in total of the main components (calculated as the oxides), and having an average crystal grain size of 3 μm or more and less than 8 μm and a density of 4.65 g/cm³ or more.

5 Claims, 1 Drawing Sheet

(52) U.S. Cl.
  CPC ......... (2013.01); *C04B 2235/3244* (2013.01); *C04B 2235/3251* (2013.01); *C04B 2235/3274* (2013.01); *C04B 2235/3277* (2013.01); *C04B 2235/3418* (2013.01); *C04B 2235/442* (2013.01); *C04B 2235/5436* (2013.01); *C04B 2235/604* (2013.01); *C04B 2235/6562* (2013.01); *C04B 2235/6565* (2013.01); *C04B 2235/6567* (2013.01); *C04B 2235/77* (2013.01); *C04B 2235/786* (2013.01); *C04B 2235/96* (2013.01)

(58) Field of Classification Search
  CPC .... C04B 2235/3251; C04B 2235/3274; C04B 2235/3277; C04B 2235/3418; C04B 2235/77; C04B 2235/786; C04B 2235/96
  See application file for complete search history.

(56) References Cited

U.S. PATENT DOCUMENTS

| | | |
|---|---|---|
| 2008/0007377 A1 | 1/2008 | Ishiwaki et al. |
| 2009/0242827 A1 | 10/2009 | Nakahata et al. |
| 2011/0279217 A1 | 11/2011 | Yoshida et al. |
| 2016/0284453 A1 | 9/2016 | Okano et al. |
| 2017/0352455 A1 | 12/2017 | Koyuhara et al. |

FOREIGN PATENT DOCUMENTS

| | | |
|---|---|---|
| JP | 06-310320 A | 11/1994 |
| JP | 2007-031240 A | 2/2007 |
| JP | 2007-150006 A | 6/2007 |
| JP | 2009-227554 A | 10/2009 |
| JP | 2010-173899 A | 8/2010 |
| WO | 2006/054749 A1 | 5/2006 |
| WO | 2016/104593 A1 | 6/2016 |

OTHER PUBLICATIONS

Communication dated Jun. 2, 2021 from the China National Intellectual Property Administration in Application No. 201880021725.5.

Communication dated Mar. 18, 2021 from the European Patent Office in EP Application No. 18778138.0.

* cited by examiner

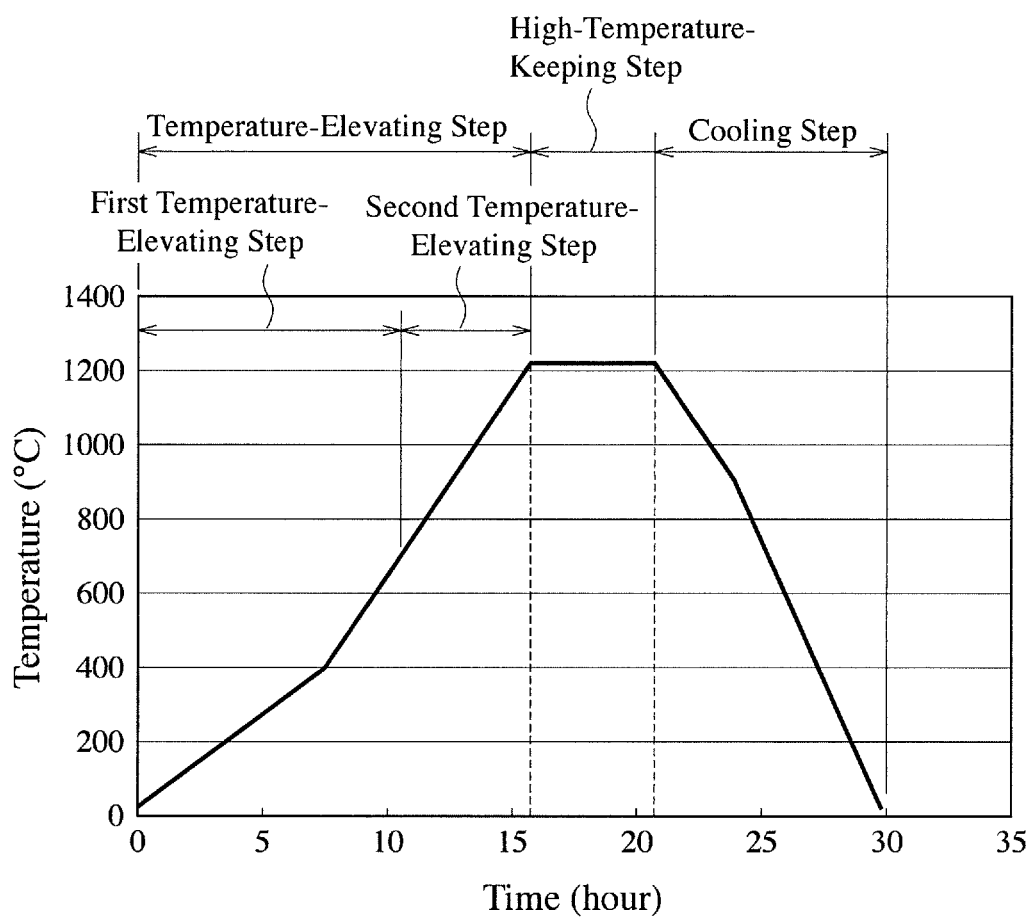

SINTERED MNZN FERRITE BODY

CROSS REFERENCE TO RELATED APPLICATIONS

This application is a National Stage of International Application No. PCT/JP2018/012288 filed Mar. 27, 2018, claiming priority based on Japanese Patent Application No. 2017-062811 filed Mar. 28, 2017.

FIELD OF THE INVENTION

The present invention relates to a sintered MnZn ferrite body used for magnetic cores of electronic devices such as transformers, inductors, reactors and choke coils used in various power supply devices.

BACKGROUND OF THE INVENTION

Electric vehicle, which is one of electric transportation equipments such as Electric Vehicle (EV) and Plug-in Hybrid Electric Vehicle (PHEV) which are rapidly spreading in recent years, is equipped with devices such as high power electric motors and chargers. Electronic devices that can withstand high voltage and large current are used for them. The electronic devices are composed of coils and magnetic cores as a basic structure, and the magnetic cores are made of a magnetic material such as a sintered MnZn ferrite body.

In such applications, not only various mechanical and electrical load conditions are put on the electronic devices during running, but also the environmental temperature to be used is varies. Normally, in anticipation of heat generation due to core loss, the temperature at which the core loss is minimized is adjusted by the crystal magnetic anisotropy constant K1 to a temperature slightly higher than the maximum environmental temperature to which the electronic devices are exposed, thereby preventing ferrite from losing magnetism due to thermal runaway.

In addition, MnZn ferrite whose composition is designed so that the minimum temperature of core loss (also referred to as power loss) is, for example, 100° C. or less is used for electronic devices used for home electronic appliances. It is required to have low core loss in a wide temperature range.

The core loss of the MnZn ferrite has temperature dependence, and has a minimum value at a temperature at which the crystal magnetic anisotropy constant K1 is 0 which the hysteresis loss is small. The temperature at which the crystal magnetic anisotropy constant K1 is 0 can be changed by appropriately adjusting the amount of metal ions having positive crystal magnetic anisotropy constants K1 and the amount of metal ions having negative crystal magnetic anisotropy constants K1 among metal ions constituting the spinel in the MnZn ferrite. The metal ions constituting the spinel include $Fe^{2+}$, $Co^{2+}$, etc. as metal ions having positive K1 and $Fe^{3+}$, $Mn^{2+}$, etc. as metal ions having negative K1. The temperature at which the core loss is minimized can be relatively easily changed by adjusting the amount of metal ions such as $Fe^{2+}$, $Fe^{3+}$, $Zn^{2+}$ and $Mn^{2+}$, however, it is difficult to improve the temperature dependence of core loss only by adjusting the amount of these metal ions. Accordingly, $Co^{2+}$ having a sufficiently large crystal magnetic anisotropy constant than $Fe^{2+}$ is introduced so as to improve the temperature dependency of the core loss.

Such core loss Pcv of ferrite is generally composed of hysteresis loss Ph, eddy current loss Pe, and residual loss Pr. The hysteresis loss Ph increases in proportion to the frequency by direct current hysteresis. The eddy current loss Pe increases in proportion to the square of the frequency by the eddy current generated by the electromotive force generated by the electromagnetic induction action. The residual loss Pr which is the remaining loss caused by magnetic domain wall resonance, etc., becomes apparent at a frequency of 500 kHz or more. Namely, the hysteresis loss Ph, the eddy current loss Pe, and the residual loss Pr vary with the frequency, and the ratio of them in the total core loss depends on the frequency band. Thus, MnZn ferrite is required to be suitable for the frequency and temperature to be used.

As ferrite having low core loss in a wide temperature range, for example, JP H05-198416 A discloses MnZn ferrite obtained by adding 0.001-0.030% by weight of SiC and 0.02-0.30% by weight of CaO, and also at least one selected from the group consisting of 0.01-0.08% by weight of niobium oxide, 0.05-0.40% by weight of titanium oxide, 0.005-0.08% by weight of antimony oxide, 0.02-0.15 wt % tantalum oxide, 0.005-0.20 wt % vanadium oxide, 0.02-0.15% by weight of zirconium oxide, 0.02-0.50% by weight of tin oxide, 0.01-0.50% by weight of aluminum oxide, 0.01-1.0% by weight of cobalt oxide, 0.02-0.15% by weight of copper oxide, 0.05-1.0% by weight of hafnium oxide and 0.001-0.030% by weight of silicon oxide, to 100% by weight of a basic composition comprising 52.0-54.7% by mol of $Fe_2O_3$, 31-40% by mol of MnO, and 6-15% by mol of ZnO. This MnZn ferrite has low core loss at a frequency of 100 kHz, a maximum magnetic flux density of 200 mT, and a temperature of 100° C., however, does not have sufficiently low core loss at higher frequencies (300-500 kHz).

Co is known to be effective in improving the temperature dependence of core loss; however, in MnZn ferrite containing Co, since divalent metal ions ($Co^{2+}$) are likely to move through lattice defects, magnetic anisotropy increases, resulting in a temporal change in magnetic properties such as an increase in core loss and a decrease in magnetic permeability. The temporal change is large in a high temperature environment. Accordingly, MnZn ferrite used for electronic devices that are easily exposed to high temperature is required to further reduce core loss and to suppress the temporal change of the magnetic characteristics.

OBJECT OF THE INVENTION

Accordingly, an object of the present invention is to provide a sintered MnZn ferrite body having low core loss in a wide temperature range at a high frequency of 300-500 kHz and a small temporal change of core loss under high temperature environment.

SUMMARY OF THE INVENTION

A sintered MnZn ferrite body of the present invention is characterized in that said sintered MnZn ferrite body comprises main components comprising 53.30-53.80% by mol of Fe calculated as $Fe_2O_3$, 6.90-9.50% by mol Zn calculated as ZnO, and the balance of Mn calculated as MnO, and sub-components comprising 0.003-0.020 parts by mass of Si calculated as $SiO_2$, more than 0 parts and 0.35 parts or less by mass of Ca calculated as $CaCO_3$, 0.30-0.50 parts by mass of Co calculated as $Co_3O_4$, 0.03-0.10 parts by mass of Zr calculated as $ZrO_2$, and 0-0.05 parts by mass of Ta calculated as $Ta_2O_5$, per 100 parts by mass in total of the main components (calculated as the oxides), and has an average crystal grain size of 3 μm or more and less than 8 μm, and a density of 4.65 g/cm$^3$ or more.

In the sintered MnZn ferrite body of the present invention, the content of Ta is preferably 0.01 parts or more by mass calculated as $Ta_2O_5$.

In the sintered MnZn ferrite body of the present invention, it is preferable that the content of Fe is 53.40-53.70% by mol calculated as $Fe_2O_3$, the content of Zn is 7.00-9.40% by mol calculated as ZnO, and the content of Si is 0.004-0.015 parts by mass calculated as $SiO_2$, the content of Co is 0.30-0.45 parts by mass calculated as $Co_3O_4$, and the content of Zr is 0.05-0.09 parts by mass calculated as $ZrO_2$.

The sintered MnZn ferrite body of the present invention preferably has (a) core loss Pcv20 of 300 $kW/m^3$ or less at 20° C. at a frequency of 300 kHz and an exciting magnetic flux density of 100 mT, and core loss Pcv100 of 320 $kW/m^3$ or less at 100° C. at a frequency of 300 kHz and an exciting magnetic flux density of 100 mT, and (b) core loss Pcv20 of 650 $kW/m^3$ or less at 20° C. at a frequency of 500 kHz and exciting magnetic flux density at 100 mT, and core loss Pcv100 of 850 $kW/m^3$ or less at 100° C. at a frequency of 500 kHz and exciting magnetic flux density at 100 mT.

The sintered MnZn ferrite body of the present invention preferably has a core loss change ratio Ps represented by the following formula (1):

$$Ps(\%) = [(Pcv100B - Pcv100A)/Pcv100A] \times 100 \quad (1),$$

(wherein Pcv100A is core loss at 100° C. before keeping at 200° C., and Pcv100B is core loss at 100° C. after keeping at 200° C. for 96 hours, and both are those measured at a frequency of 300 kHz and maximum magnetic flux density of 100 mT,) of 5% or less.

Effects of the Invention

Because the sintered MnZn ferrite body of the present invention has low core loss in a wide temperature range at a high frequency of 300-500 kHz and a small temporal change of core loss under high temperature environment, it is suitable for magnetic cores used for electronic devices exposed to high temperature.

BRIEF DESCRIPTION OF THE DRAWINGS

FIG. 1 is a graph schematically showing a sintering process for obtaining a sintered MnZn ferrite body of the present invention.

DESCRIPTION OF THE PREFERRED EMBODIMENTS

Embodiments of the present invention will be described in detail below, however, the present invention is not restricted thereto, and modifications may be made properly within the scope of the technical idea of the present invention.

[1] Sintered MnZn Ferrite Body (A) Composition

A sintered MnZn ferrite body of the present invention contains main components comprising Fe, Mn and Zn, and sub-components comprising Si, Ca, Co and Zr. The sintered MnZn ferrite body of the present invention may further contain Ta as a sub-component. The main components are the elements mainly constituting spinel ferrite, and the subcomponents are the elements assisting formation of spinel ferrite. Although Co constitutes spinel ferrite, Co is treated as a subcomponent in the present invention because its content is significantly lower than that of the main components.

(1) Main Components

In order to reduce the core loss Pcv at a desired temperature, it is necessary to appropriately adjust the amount of metal ions exhibiting positive crystal magnetic anisotropy constants K1 and the amount of metal ions exhibiting negative crystal magnetic anisotropy constants K1 both constituting the spinel. However, degree of freedom in selecting the composition is small because it is also necessary to meet the requirements for magnetic properties other than the core loss Pcv such as a saturation magnetic flux density Bs, a Curie temperature Tc, and initial permeability μi. Further, in order to keep the core loss small in a wide temperature range, it is necessary to set a temperature at which the core loss is minimized. Accordingly, to have a saturation magnetic flux density Bs of 500 mT or more, a Curie temperature Tc of 230° C. or more, and initial permeability of 1500 or more so as to be usable for electronic device cores that withstand the use of high voltage and large current at high temperatures, and to have low core loss in a wide temperature range by setting the minimum temperature of the core loss to, for example, 100° C. or less, preferably 80° C. or less, the composition of the main components comprises 53.30-53.80% by mol of Fe calculated as $Fe_2O_3$, 6.90-9.50% by mol Zn calculated as ZnO, and the balance of Mn calculated as MnO.

(a) Fe: 53.30-53.80% by mol (calculated as $Fe_2O_3$)

When the content of Fe is less than 53.30% by mol, the minimum temperature of the core loss increases, the core loss on the low temperature side increases, and the effect of reducing core loss in the temperature range of 20-100° C. cannot be sufficiently obtained. When exceeding 53.80% by mol, the minimum temperature of the core loss is lowered, the core loss on the high temperature side increases, and the effect of reducing core loss in the temperature range of 20-100° C. cannot be sufficiently obtained. The lower limit of Fe content is preferably 53.40% by mol, and more preferably 53.45% by mol. On the other hand, the upper limit of Fe content is preferably 53.70% by mol, and more preferably 53.65% by mol.

(b) Zn: 6.90-9.50% by mol (calculated as ZnO)

When the content of Zn is less than 6.90% by mol, temperature change of the core loss is large, which is not preferable, and when more than 9.50% by mol, it is difficult to obtain a sufficient saturation magnetic flux density. The lower limit of Zn content is preferably 7.00% by mol, more preferably 8.00% by mol, and most preferably 9.10% by mol. On the other hand, the upper limit of Zn content is preferably 9.40% by mol, and more preferably 9.30% by mol.

(c) Mn: balance (calculated as MnO)

The content of Mn is the balance obtained by subtracting the content of Fe and the content of Zn from the total amount of the main components (Fe, Zn and Mn).

(2) Sub-Components

The sintered MnZn ferrite body of the present invention contains at least Si, Ca, Co and Zr as sub-components, and optionally contains Ta. The composition of the sub-components is expressed in parts by mass per 100 parts by mass in total of the main components (calculated as the oxides).

(a) Si: 0.003-0.020 parts by mass (calculated as $SiO_2$)

Si segregates in grain boundaries to insulate the crystal grain (increase grain boundary resistance), and reduces relative loss coefficient tan δ/μi, thereby reducing eddy current loss. As a result, the core loss of the sintered MnZn ferrite body is reduced in the high frequency region. When the content of Si is too small, the effect of enhancing the grain boundary resistance is small, and when the content of Si is too large, crystal enlargement is induced reversely to deteriorate the core loss.

When 0.003-0.020 parts by mass of Si calculated as $SiO_2$ is contained, grain boundary resistance sufficient to reduce eddy current loss can be secured in combination with other sub-components, which can result in the sintered MnZn ferrite body having low loss in a high frequency region of 300 kHz or more. The lower limit of the Si content is preferably 0.004 parts by mass calculated as $SiO_2$, and more preferably 0.005 parts by mass. On the other hand, the upper limit of Si content is preferably 0.015 parts by mass calculated as $SiO_2$, and more preferably 0.012 parts by mass.

(b) Ca: more than 0 parts and 0.35 parts or less by mass (calculated as $CaCO_3$)

Ca segregates in grain boundaries to insulate the crystal grain (increase grain boundary resistance), and reduces relative loss coefficient tan $\delta/\mu i$, thereby reducing eddy current loss. As a result, the core loss of the sintered MnZn ferrite body is reduced in the high frequency region. When the content of Ca is too small, the effect of enhancing the grain boundary resistance is small, and when the content of Ca is too large, crystal enlargement is induced reversely to deteriorate the core loss.

When 0 parts or more and 0.35 parts or less by mass of Ca calculated as $CaCO_3$ is contained, grain boundary resistance sufficient to reduce eddy current loss can be secured in combination with other sub-components, which can result in the low loss in a high frequency region of 300 kHz or more. The lower limit of the Ca content is preferably 0.05 parts by mass calculated as $CaCO_3$, and more preferably 0.07 parts by mass. On the other hand, the upper limit of Ca content is preferably 0.30 parts by mass calculated as $CaCO_3$, and more preferably 0.20 parts by mass.

(c) Co: 0.30-0.50 parts by mass (calculated as $Co_3O_4$)

Co is an element effective to improve the temperature dependence of core loss. $Co^{2+}$ as a metal ion having a positive crystal magnetic anisotropy constant K1 together with $Fe^{2+}$ has an effect of adjusting the temperature at which the core loss is minimized. Also, Co reduces a residual magnetic flux density Br to reduce the hysteresis loss Ph. On the other hand, since $Co^{2+}$ has a larger crystal magnetic anisotropy constant K1 than $Fe^{2+}$, when the content of Co is too large, a magnetization curve tends to be a Perminber type, and a crystal magnetic anisotropy constant on the low temperature side is too large on the positive side, resulting in remarkable increase of the loss in the low temperature region, thereby the temperature dependence of the core loss is also deteriorated. On the other hand, when the content of Co is too low, the effect of improving the temperature dependence is small.

When 0.30-0.50 parts by mass of Co calculated as $Co_3O_4$ is contained, core loss in the practical temperature range can be reduced in combination with other sub-components, and the temperature dependence can be improved. The upper limit of the Co content is preferably 0.45 parts by mass calculated as $Co_3O_4$, and more preferably 0.40 parts by mass.

(d) Zr: 0.03-0.10 parts by mass (calculated as $ZrO_2$)

0.03-0.10 parts by mass of Zr calculated as $ZrO_2$ mainly segregates in grain boundary layer together with Si and Ca to increase grain boundary resistance, thereby contributes to low loss, and also reduces a core loss change ratio Ps. When the content of Zr is too small, the reducing effects of the core loss and the core loss change ratio Ps are small, and when the content of Zr is too large, coarse grains grow and the core loss increases. The lower limit of the Zr content is preferably 0.05 parts by mass calculated as $ZrO_2$, and more preferably 0.06 parts by mass. The upper limit of the Zr content is preferably 0.09 parts by mass calculated as $ZrO_2$, and more preferably 0.08 parts by mass.

(e) Ta: 0-0.05 parts by mass (calculated as $Ta_2O_5$)

Since Ta segregates at the grain boundary layer to increase grain boundary resistance, 0.05 parts by mass may be contained as the upper limit, or 0 parts by mass may be contained (not contained). When the content of Ta is too large, Ta penetrates into crystal grains and increases the core loss of the sintered MnZn ferrite body. By containing 0-0.05 parts by mass of Ta calculated as $Ta_2O_5$, grain boundary resistance sufficient to reduce eddy current loss can be secured, and hysteresis loss and residual loss are reduced particularly at high temperature (100° C.) in a high frequency region of 500 KHz or more, and thereby low loss in a wide temperature range in a high frequency region is achieved. When Ta is contained, the lower limit of its content is preferably 0.01 parts by mass calculated as $Ta_2O_5$. The upper limit of the Ta content is preferably 0.04 parts by mass calculated as $Ta_2O_5$, and more preferably 0.03 parts by mass.

Among the sub-components, although Si exclusively segregates in grain boundaries and triple points, Ca, Zr and Ta are dissolved in spinel phase in the course of the sintering step, and may be partly dissolved after sintering and remain in the crystal grains in some cases. When the contents of Ca, Zr and Ta dissolved in the spinel phase increase, the resistance in the crystal grain increases, and a volume resistivity p is increased. However, the contents of Ca, Zr and Ta in the grain boundaries relatively decrease. To obtain a sintered MnZn ferrite body having low core loss by achieving a high volume resistivity, it is effective to increase the resistance in crystal grains and to form high-resistance grain boundaries by appropriately adjusting the contents of Ca, Zr and Ta dissolved in spinel phase and segregated in crystal grain boundaries. Such adjustment can be carried out by controlling sintering temperature and sintering atmosphere as described later.

(3) Impurities

Raw materials constituting the sintered MnZn ferrite body may contain sulfur S, chlorine Cl, phosphorus P, boron B, etc. as impurities. Particularly, S generates a compound with Ca and the compound segregates as foreign matter at the grain boundaries, thereby decreasing the volume resistivity p and increasing the eddy current loss. It is empirically known that reduction in core loss and improvement in magnetic permeability can be obtained by decreasing these impurities. Therefore, for further reduction of the core loss, it is preferable to be 0.03 parts or less by mass of S, 0.01 parts or less by mass of Cl, 0.001 parts or less by mass of P, and 0.0001 parts or less by mass of B, per 100 parts by mass in total of the main components (calculated as the oxides).

The quantitative determination of the main components, the sub-components, and the impurities can be conducted by fluorescent X-ray analysis and ICP emission spectral analysis. Qualitative analysis of the contained elements is previously carried out by fluorescent X-ray analysis, and then the contained elements are quantified by a calibration curve method comparing with a standard sample.

(B) Average Crystal Grain Size

The sintered MnZn ferrite body of the present invention has an average crystal grain size of 3 µm or more and less than 8 µm. The average crystal grain size of 8 µm or more provides insufficient effect of reducing eddy current loss and residual loss, and increased core loss in a high frequency region of 500 KHz or less. On the other hand, the average crystal grain size of less than 3 μm makes grain boundaries act as pinning points of magnetic domain walls, inducing a decrease in permeability and an increase in of core loss due to a demagnetizing field. The average crystal grain size is preferably 4-7 μm. It is noted that the average crystal grain size is determined by the method described in the following examples.

(C) Density of Sintered Body

The sintered MnZn ferrite body of the present invention has a density of 4.65 g/cm$^3$ or more. When the density of the sintered body is less than 4.65 g/cm$^3$, the mechanical strength is poor, easily resulting in chipping and cracking. The preferred density of the sintered body is 4.75 g/cm$^3$ or more. It is noted that the density of the sintered body is determined by the method described in the following examples.

[2] Production Method of Sintered MnZn Ferrite Body

FIG. 1 shows the temperature conditions in the sintering step for producing the sintered MnZn ferrite body of the present invention. The sintering step comprises a temperature-elevating step, a high-temperature-keeping step, and a cooling step. By adjusting the partial pressure of oxygen in the sintering step, Ca, Zr, etc. are segregated in grain boundaries, and the amounts of them dissolved in crystal grains is appropriately controlled, resulting in reduced core loss.

(A) Temperature-Elevating Step

The first temperature-elevating step of the temperature-elevating step, from room temperature to a temperature of 400-950° C. is conducted in the air to remove the binder from the green body. In the second temperature-elevating step after the first temperature-elevating step to the high-temperature-keeping step, it is preferable to reduce an oxygen concentration in an atmosphere to 0.01-0.5% by volume. In the temperature-elevating step, the temperature-elevating speed is appropriately selected according to the degree of carbon residue in the binder removal, the composition, etc. The average temperature-elevating speed is preferably in the range of 50-200° C./hour.

(B) High-Temperature-Keeping Step

The high-temperature-keeping step is preferably conducted at a temperature of 1150-1250° C. with controlling an oxygen concentration in an atmosphere to 0.1-0.5% by volume. The oxygen concentration in an atmosphere in the high-temperature-keeping step is preferably set higher than the oxygen concentration in the second temperature-elevating step.

(C) Cooling Step

When the oxygen concentration is too high in the cooling step, oxidation of the sintered body proceeds to precipitate hematite from spinel. On the other hand, when the oxygen concentration is too low, wustite precipitates, resulting in crystal distortion, thereby core loss increases. It is preferable to control the oxygen concentration in the cooling step so that hematite and wustite does not precipitate. Specifically, it is preferable to control the oxygen concentration in the cooling step so that the oxygen concentration $P_{O2}$ (volume fraction) and the temperature T (° C.) meet the following formula (2):

$$\text{Log } P_{O2} = a - b/(T+273) \qquad (2)$$

wherein a is a constant of 3.1-12.8 and b is a constant of 6000-20000. a is defined from the temperature and the oxygen concentration in the high-temperature-keeping step. When b is less than 6000, the oxygen concentration is high even if the temperature drops, and oxidation proceeds, thereby hematite may be precipitated from spinel. On the other hand, when b is larger than 20000, the oxygen concentration decreases to precipitate wustite, and both the crystal grain and the grain boundary layer are not sufficiently oxidized, and the resistance is reduced. a is more preferably 6.4-11.5, and b is more preferably 10000-18000.

The sintered MnZn ferrite body obtained by the above mentioned sintering step has a volume resistivity of 5 Ω·m or more at room temperature. Further, the volume resistivity is preferably 10 Ω·m or more so as to reduce the eddy current loss Pe.

The present invention will be explained in further detail by Examples below, without intention of restriction.

Examples 1-50 and Comparative Examples 1-8

$Fe_2O_3$ powder, ZnO powder, and $Mn_3O_4$ powder as the main components were wet mixed in the proportions shown in Table 1, then dried, and calcined for 3 hours at 900° C. It is noted that the amount of $Mn_3O_4$ powder added is represented in that calculated as MnO in Table 1. 100 parts by mass of each obtained calcined powder was added with $SiO_2$ powder, $CaCO_3$ powder, $Co_3O_4$ powder, $ZrO_2$ powder, and $Ta_2O_5$ powder in the proportions shown in Table 1 in a ball mill to be pulverized and mixed for the time shown in Table 2 so that the average particle diameter was about 1.2-1.4 μm. With polyvinyl alcohol added as a binder, the each obtained mixture was granulated in a mortar, and compression-molded to a ring-shaped green body.

Each green body was sintered by a sintering step comprising a temperature-elevating step rising a temperature from room temperature to a keeping temperature shown in Table 2, a high-temperature-keeping step holding the keeping temperature for 5 hours, and a cooling step cooling from the keeping temperature to room temperature. In the temperature-elevating step, a temperature-elevating speed was 50° C./hour to 400° C., and 100° C./hour from 400° C. to the keeping temperature, and the oxygen concentration in a sintering atmosphere was 21% by volume from room temperature to 700° C. (air is used), and 0.1% by volume after reaching 700° C. The oxygen concentration in the high-temperature-keeping step is shown in Table 2. The cooling step was conducted at a cooling speed of 100° C./hour from the keeping temperature to 900° C., and thereafter of 150° C./hour. In the cooling step, the oxygen concentration (% by volume) was adjusted to the equilibrium oxygen partial pressure to 1000° C. After 900° C., the cooling step was conducted in a stream of $N_2$ to reduce the final oxygen concentration to about 0.003% by volume. Thus, an annular sintered MnZn ferrite body (a magnetic core) having an outer diameter of 25 mm, an inner diameter of 15 mm and a thickness of 5 mm was obtained.

The density, volume resistivity ρ, average crystal grain size, saturation magnetic flux density Bs, initial permeability μi, and core loss Pcv of each sintered MnZn ferrite body was measured by the following method.

(1) Density of Sintered Body

The density was calculated by the method of measuring volume and mass from the dimensions and weight of each sintered MnZn ferrite body. The results are shown in Table 3.

(2) Volume Resistivity ρ

A plate-like sample was cut out from each sintered MnZn ferrite body, silver paste electrodes were provided on the two opposing surfaces of the plate-like sample, and the electrical resistance R (Ω) was measured using a milliohm high tester 3224 manufactured by HIOKI E. E. CORPORATION. The volume resistivity ρ (Ω·m) was calculated from the area A (m$^2$) of the surface on which the electrode formed and the thickness t (m) by the following formula (3). The results are shown in Table 3.

$$\rho(\Omega \cdot m) = R \times (A/t) \quad (3)$$

(3) Average Crystal Grain Size

The grain boundaries on the mirror polished surface of each sintered MnZn ferrite body were thermally etched (at 1100° C. and for 1 hr in N$_2$), and then taken a micrograph by an optical microscope (400 times). The average crystal grain size was calculated as an equivalent circle diameter by quadrature method in a square region of 100 μm×100 μm in the photograph. The results are shown in Table 3.

(4) Saturation Magnetic Flux Density Bs

Each sintered MnZn ferrite body was used was a magnetic core. Using a DC magnetization analyzer (SK-110 available from Metron Co., Ltd.), the saturation magnetic flux density (Bs) of the magnetic core having a 40-turn primary winding and a 40-turn secondary winding was measured at 23° C. in a magnetic field of 1.2 kA/m. The results are shown in Table 3.

(5) Initial Permeability μi

Each sintered MnZn ferrite body was used as a magnetic core. The initial permeability μi of the 10-turn magnetic core was measured at 23° C. and 100 kHz in a magnetic field of 0.4 A/m by HP-4285A available from Hewlett-Packard. The results are shown in Table 3.

(6) Core Loss Pcv

Each sintered MnZn ferrite body was used as a magnetic core. Using a B-H analyzer (SY-8232 available from Iwatsu Electric Co., Ltd.), the core loss Pcv of the magnetic core having a four-turn primary winding and a four-turn secondary winding was measured at 20° C., 40° C., 60° C., 80° C., 100° C., 120° C. and 140° C. at frequencies of 300 kHz and 500 kHz, and an exciting magnetic flux density of 100 mT. The results are shown in Tables 4 and 5.

TABLE 1

| Sample No. | Composition | | | | | | | |
|---|---|---|---|---|---|---|---|---|
| | Main Components (% by mol) | | | Sub-Components (parts by mass) | | | | |
| | Fe$_2$O$_3$ | ZnO | MnO | CaCO$_3$ | SiO$_2$ | ZrO$_2$ | Ta$_2$O$_5$ | Co$_3$O$_4$ |
| Comp. Ex. 1 | 53.24 | 9.31 | Bal. | 0.18 | 0.009 | 0.06 | 0.02 | 0.33 |
| Comp. Ex. 2 | 53.49 | 9.26 | Bal. | 0.18 | 0.012 | 0.06 | 0.02 | 0.33 |
| Example 1 | 53.49 | 9.26 | Bal. | 0.18 | 0.009 | 0.06 | 0.02 | 0.33 |
| Example 2 | 53.49 | 9.26 | Bal. | 0.18 | 0.012 | 0.06 | 0.02 | 0.33 |
| Example 3 | 53.49 | 9.26 | Bal. | 0.18 | 0.015 | 0.06 | 0.02 | 0.33 |
| Example 4 | 53.49 | 9.26 | Bal. | 0.18 | 0.012 | 0.06 | 0.02 | 0.33 |
| Example 5 | 53.49 | 9.26 | Bal. | 0.18 | 0.012 | 0.06 | 0.02 | 0.33 |
| Example 6 | 53.35 | 9.26 | Bal. | 0.18 | 0.012 | 0.06 | 0.02 | 0.33 |
| Example 7 | 53.42 | 9.26 | Bal. | 0.18 | 0.012 | 0.06 | 0.02 | 0.33 |
| Example 8 | 53.49 | 9.26 | Bal. | 0.18 | 0.012 | 0.06 | 0.02 | 0.33 |
| Example 9 | 53.56 | 9.26 | Bal. | 0.18 | 0.012 | 0.06 | 0.02 | 0.33 |
| Example 10 | 53.63 | 9.26 | Bal. | 0.18 | 0.012 | 0.06 | 0.02 | 0.33 |
| Comp. Ex. 3 | 53.49 | 9.26 | Bal. | 0.12 | 0.006 | 0.15 | 0.33 | |
| Example 11 | 53.49 | 9.26 | Bal. | 0.18 | 0.006 | 0.06 | 0.02 | 0.33 |
| Example 12 | 53.49 | 9.26 | Bal. | 0.18 | 0.006 | 0.1 | 0.01 | 0.33 |
| Example 13 | 53.49 | 9.26 | Bal. | 0.18 | 0.006 | 0.1 | 0 | 0.33 |
| Example 14 | 53.49 | 9.26 | Bal. | 0.18 | 0.006 | 0.08 | 0.02 | 0.33 |
| Example 15 | 53.49 | 9.26 | Bal. | 0.18 | 0.006 | 0.08 | 0.01 | 0.33 |
| Example 16 | 53.49 | 9.26 | Bal. | 0.18 | 0.006 | 0.08 | 0 | 0.33 |
| Example 17 | 53.49 | 9.26 | Bal. | 0.12 | 0.006 | 0.08 | 0.02 | 0.33 |
| Example 18 | 53.49 | 9.26 | Bal. | 0.12 | 0.006 | 0.08 | 0.01 | 0.33 |
| Example 19 | 53.49 | 9.26 | Bal. | 0.12 | 0.006 | 0.08 | 0 | 0.33 |
| Example 20 | 53.49 | 9.26 | Bal. | 0.07 | 0.006 | 0.08 | 0.02 | 0.33 |
| Example 21 | 53.49 | 9.26 | Bal. | 0.07 | 0.006 | 0.08 | 0.01 | 0.33 |
| Example 22 | 53.49 | 9.26 | Bal. | 0.07 | 0.006 | 0.08 | 0 | 0.33 |
| Example 23 | 53.49 | 9.26 | Bal. | 0.18 | 0.003 | 0.08 | 0.01 | 0.33 |
| Example 24 | 53.49 | 9.26 | Bal. | 0.12 | 0.003 | 0.08 | 0.01 | 0.33 |
| Example 25 | 53.49 | 9.26 | Bal. | 0.12 | 0.003 | 0.08 | 0.02 | 0.33 |
| Example 26 | 53.49 | 9.26 | Bal. | 0.07 | 0.003 | 0.08 | 0.02 | 0.33 |
| Example 27 | 53.49 | 9.26 | Bal. | 0.07 | 0.012 | 0.08 | 0.02 | 0.33 |
| Example 28 | 53.49 | 9.26 | Bal. | 0.07 | 0.012 | 0.08 | 0.01 | 0.33 |
| Example 29 | 53.49 | 9.26 | Bal. | 0.07 | 0.006 | 0.08 | 0.02 | 0.33 |
| Example 30 | 53.49 | 9.26 | Bal. | 0.07 | 0.009 | 0.08 | 0.02 | 0.33 |
| Example 31 | 53.49 | 9.26 | Bal. | 0.07 | 0.012 | 0.08 | 0.02 | 0.33 |
| Example 32 | 53.49 | 9.26 | Bal. | 0.07 | 0.009 | 0.08 | 0.01 | 0.33 |
| Example 33 | 53.49 | 9.26 | Bal. | 0.07 | 0.012 | 0.08 | 0.01 | 0.33 |
| Example 34 | 53.49 | 9.26 | Bal. | 0.18 | 0.006 | 0.06 | 0.02 | 0.33 |
| Example 35 | 53.49 | 9.26 | Bal. | 0.07 | 0.006 | 0.08 | 0.02 | 0.33 |
| Example 36 | 53.49 | 9.26 | Bal. | 0.07 | 0.009 | 0.08 | 0.02 | 0.33 |
| Example 37 | 53.49 | 9.26 | Bal. | 0.07 | 0.012 | 0.08 | 0.02 | 0.33 |
| Example 38 | 53.49 | 9.26 | Bal. | 0.07 | 0.009 | 0.08 | 0.01 | 0.33 |
| Example 39 | 53.49 | 9.26 | Bal. | 0.07 | 0.012 | 0.08 | 0.01 | 0.33 |
| Example 40 | 53.49 | 9.26 | Bal. | 0.18 | 0.006 | 0.06 | 0.02 | 0.33 |
| Example 41 | 53.51 | 9.21 | Bal. | 0.07 | 0.015 | 0.08 | 0.02 | 0.33 |
| Example 42 | 53.51 | 9.21 | Bal. | 0.07 | 0.02 | 0.08 | 0.02 | 0.33 |
| Comp. Ex. 4 | 53.51 | 9.21 | Bal. | 0.07 | 0.025 | 0.08 | 0.02 | 0.33 |
| Example 43 | 53.51 | 9.21 | Bal. | 0.07 | 0.015 | 0.08 | 0.01 | 0.33 |
| Example 44 | 53.51 | 9.21 | Bal. | 0.07 | 0.02 | 0.08 | 0.01 | 0.33 |
| Comp. Ex. 5 | 53.51 | 9.21 | Bal. | 0.07 | 0.025 | 0.08 | 0.01 | 0.33 |

TABLE 1-continued

| Sample No. | Composition | | | | | | | |
|---|---|---|---|---|---|---|---|---|
| | Main Components (% by mol) | | | Sub-Components (parts by mass) | | | | |
| | $Fe_2O_3$ | ZnO | MnO | $CaCO_3$ | $SiO_2$ | $ZrO_2$ | $Ta_2O_5$ | $Co_3O_4$ |
| Example 45 | 53.51 | 9.21 | Bal. | 0.07 | 0.015 | 0.08 | 0.02 | 0.33 |
| Example 46 | 53.51 | 9.21 | Bal. | 0.07 | 0.015 | 0.08 | 0.01 | 0.33 |
| Example 47 | 53.51 | 9.21 | Bal. | 0.07 | 0.02 | 0.08 | 0.01 | 0.33 |
| Comp. Ex. 6 | 54.57 | 6.82 | Bal. | 0.09 | 0.006 | 0.06 | 0.02 | 0.20 |
| Comp. Ex. 7 | 54.97 | 6.76 | Bal. | 0.09 | 0.006 | 0.06 | 0.02 | 0.20 |
| Comp. Ex. 8 | 53.77 | 6.94 | Bal. | 0.09 | 0.006 | 0.06 | 0.02 | 0.20 |
| Example 48 | 53.77 | 6.94 | Bal. | 0.09 | 0.006 | 0.06 | 0.02 | 0.40 |
| Example 49 | 53.77 | 6.94 | Bal. | 0.09 | 0.006 | 0.06 | 0.02 | 0.45 |
| Example 50 | 53.77 | 6.94 | Bal. | 0.09 | 0.006 | 0.06 | 0.02 | 0.50 |

TABLE 2

| Sample No. | Production Conditions | | | |
|---|---|---|---|---|
| | Pulverizing Time (hours) | Pulverized Particle Size (μm) | High-Temperature-Keeping Step | |
| | | | Keeping Temperature (° C.) | Oxygen Concentration (%)[1] |
| Comp. Ex. 1 | 3 | 1.39 | 1220 | 0.31 |
| Comp. Ex. 2 | 3 | 1.42 | 1160 | 0.13 |
| Example 1 | 3 | 1.42 | 1190 | 0.2 |
| Example 2 | 3 | 1.42 | 1190 | 0.2 |
| Example 3 | 3 | 1.42 | 1190 | 0.2 |
| Example 4 | 3 | 1.42 | 1220 | 0.31 |
| Example 5 | 3 | 1.42 | 1250 | 0.45 |
| Example 6 | 5 | 1.28 | 1190 | 0.2 |
| Example 7 | 5 | 1.28 | 1190 | 0.2 |
| Example 8 | 5 | 1.28 | 1190 | 0.2 |
| Example 9 | 5 | 1.27 | 1190 | 0.2 |
| Example 10 | 5 | 1.26 | 1190 | 0.2 |
| Comp. Ex. 3 | 7 | 1.20 | 1190 | 0.2 |
| Example 11 | 7 | 1.20 | 1190 | 0.2 |
| Example 12 | 7 | 1.20 | 1190 | 0.2 |
| Example 13 | 7 | 1.20 | 1190 | 0.2 |
| Example 14 | 7 | 1.20 | 1190 | 0.2 |
| Example 15 | 7 | 1.20 | 1190 | 0.2 |
| Example 16 | 7 | 1.20 | 1190 | 0.2 |
| Example 17 | 7 | 1.20 | 1190 | 0.2 |
| Example 18 | 7 | 1.20 | 1190 | 0.2 |
| Example 19 | 7 | 1.20 | 1190 | 0.2 |
| Example 20 | 7 | 1.20 | 1190 | 0.2 |
| Example 21 | 7 | 1.20 | 1190 | 0.2 |
| Example 22 | 7 | 1.20 | 1190 | 0.2 |
| Example 23 | 7 | 1.20 | 1190 | 0.2 |
| Example 24 | 7 | 1.20 | 1190 | 0.2 |
| Example 25 | 7 | 1.20 | 1190 | 0.2 |
| Example 26 | 7 | 1.20 | 1190 | 0.2 |
| Example 27 | 7 | 1.20 | 1160 | 0.13 |
| Example 28 | 7 | 1.20 | 1160 | 0.13 |
| Example 29 | 7 | 1.20 | 1190 | 0.2 |
| Example 30 | 7 | 1.20 | 1190 | 0.2 |
| Example 31 | 7 | 1.20 | 1190 | 0.2 |
| Example 32 | 7 | 1.20 | 1190 | 0.2 |
| Example 33 | 7 | 1.20 | 1190 | 0.2 |
| Example 34 | 7 | 1.20 | 1190 | 0.2 |
| Example 35 | 7 | 1.20 | 1220 | 0.31 |
| Example 36 | 7 | 1.20 | 1220 | 0.31 |
| Example 37 | 7 | 1.20 | 1220 | 0.31 |
| Example 38 | 7 | 1.20 | 1220 | 0.31 |
| Example 39 | 7 | 1.20 | 1220 | 0.31 |
| Example 40 | 7 | 1.20 | 1220 | 0.31 |
| Example 41 | 6 | 1.16 | 1160 | 0.13 |
| Example 42 | 6 | 1.18 | 1160 | 0.13 |
| Comp. Ex. 4 | 6 | 1.17 | 1160 | 0.13 |
| Example 43 | 6 | 1.16 | 1160 | 0.13 |
| Example 44 | 6 | 1.17 | 1160 | 0.13 |
| Comp. Ex. 5 | 6 | 1.17 | 1160 | 0.13 |

TABLE 2-continued

| | Production Conditions | | | |
|---|---|---|---|---|
| | | | High-Temperature-Keeping Step | |
| Sample No. | Pulverizing Time (hours) | Pulverized Particle Size (μm) | Keeping Temperature (° C.) | Oxygen Concentration (%)[1] |
| Example 45 | 6 | 1.16 | 1190 | 0.2 |
| Example 46 | 6 | 1.16 | 1190 | 0.2 |
| Example 47 | 6 | 1.17 | 1190 | 0.2 |
| Comp. Ex. 6 | 7 | 1.20 | 1190 | 0.2 |
| Comp. Ex. 7 | 7 | 1.20 | 1190 | 0.2 |
| Comp. Ex. 8 | 7 | 1.20 | 1190 | 0.2 |
| Example 48 | 7 | 1.20 | 1190 | 0.2 |
| Example 49 | 7 | 1.20 | 1190 | 0.2 |
| Example 50 | 7 | 1.20 | 1190 | 0.2 |

Note:
[1]Oxygen concentration (% by volume) in the atmosphere in the high-temperature-keeping step.

TABLE 3

| | Properties | | | | |
|---|---|---|---|---|---|
| Sample No. | $D^{(1)}$ (g/cm³) | $\rho^{(2)}$ (Ω·m) | $D_{av}^{(3)}$ (μm) | $B_s^{(4)}$ (mT) | $\mu i^{(5)}$ |
| Comp. Ex. 1 | 4.78 | 25.5 | 6.0 | 517 | 2,210 |
| Comp. Ex. 2 | 4.61 | 21.6 | 3.5 | 475 | 1,629 |
| Example 1 | 4.71 | 13.0 | 4.9 | 506 | 2,082 |
| Example 2 | 4.70 | 24.4 | 5.0 | 497 | 1,996 |
| Example 3 | 4.72 | 23.9 | 5.0 | 508 | 1,997 |
| Example 4 | 4.80 | 26.6 | 6.1 | 526 | 2,335 |
| Example 5 | 4.86 | 25.5 | 6.9 | 540 | 2,684 |
| Example 6 | 4.77 | 20.0 | 5.4 | 515 | 1,900 |
| Example 7 | 4.77 | 20.4 | 5.3 | 513 | 1,856 |
| Example 8 | 4.78 | 21.7 | 5.5 | 517 | 1,989 |
| Example 9 | 4.76 | 17.3 | 5.5 | 510 | 1,955 |
| Example 10 | 4.76 | 14.2 | 5.7 | 515 | 2,063 |
| Comp. Ex. 3 | 4.87 | 4.2 | 5.9 | — | 1,635 |
| Example 11 | 4.77 | 18.9 | 5.2 | 529 | 2,314 |
| Example 12 | 4.82 | 9.1 | 4.9 | 535 | 2,100 |
| Example 13 | 4.83 | 6.3 | 4.7 | 540 | 2,305 |
| Example 14 | 4.84 | 16.6 | 5.1 | 546 | 2,308 |
| Example 15 | 4.81 | 14.1 | 4.9 | 538 | 2,260 |
| Example 16 | 4.83 | 11.0 | 5.0 | 544 | 2,456 |
| Example 17 | 4.82 | 15.5 | 5.9 | 545 | 2,388 |
| Example 18 | 4.81 | 10.7 | 5.7 | 543 | 2,556 |
| Example 19 | 4.81 | 8.0 | 5.6 | 543 | 2,598 |
| Example 20 | 4.87 | 9.2 | 6.2 | 553 | 2,667 |
| Example 21 | 4.84 | 6.8 | 6.0 | 550 | 2,652 |
| Example 22 | 4.85 | 5.5 | 5.8 | 555 | 2,761 |
| Example 23 | 4.85 | 8.9 | 4.8 | 548 | 2,450 |
| Example 24 | 4.85 | 5.7 | 5.8 | 548 | 2,743 |
| Example 25 | 4.85 | 7.2 | 5.9 | 551 | 2,587 |
| Example 26 | 4.87 | 3.7 | 6.3 | 554 | 2,850 |
| Example 27 | 4.78 | 11.0 | 4.1 | 527 | 2,108 |
| Example 28 | 4.78 | 8.8 | 4.0 | 524 | 2,203 |
| Example 29 | 4.82 | 6.6 | 6.2 | 535 | 2,687 |
| Example 30 | 4.84 | 9.6 | 6.1 | 540 | 2,685 |
| Example 31 | 4.84 | 13.2 | 6.1 | 540 | 2,426 |
| Example 32 | 4.83 | 8.2 | 6.3 | 536 | 2,696 |
| Example 33 | 4.84 | 11.9 | 6.0 | 538 | 2,509 |
| Example 34 | 4.76 | 15.5 | 5.3 | 524 | 2,312 |
| Example 35 | 4.88 | 7.8 | 7.5 | 551 | 3,033 |
| Example 36 | 4.89 | 9.3 | 7.4 | 557 | 3,038 |
| Example 37 | 4.89 | 15.4 | 7.6 | 556 | 2,790 |
| Example 38 | 4.88 | 9.9 | 7.7 | 555 | 3,021 |
| Example 39 | 4.88 | 13.2 | 7.5 | 545 | 2,809 |
| Example 40 | 4.85 | 17.0 | 7.2 | 537 | 2,598 |
| Example 41 | 4.81 | 13.4 | 4.0 | 535 | 2,145 |
| Example 42 | 4.84 | 14.7 | 4.1 | 542 | 1,963 |
| Comp. Ex. 4 | 4.88 | 14.3 | 4.1 | 554 | 2,019 |
| Example 43 | 4.82 | 12.0 | 4.1 | 540 | 2,189 |
| Example 44 | 4.85 | 12.5 | 4.2 | 545 | 2,051 |
| Comp. Ex. 5 | 4.88 | 12.1 | 4.1 | 550 | 1,980 |
| Example 45 | 4.86 | 15.8 | 5.8 | 547 | 2,479 |
| Example 46 | 4.87 | 14.1 | 5.9 | 550 | 2,509 |
| Example 47 | 4.89 | 14.8 | 5.9 | 553 | 2,328 |
| Comp. Ex. 6 | 4.85 | 6.1 | 5.5 | 553 | 2,693 |
| Comp. Ex. 7 | 4.86 | 5.8 | 5.6 | 555 | 2,107 |
| Comp. Ex. 8 | 4.83 | 9.0 | 5.5 | 541 | 2,077 |
| Example 48 | 4.85 | 10.8 | 5.6 | 544 | 2,426 |
| Example 49 | 4.86 | 9.2 | 5.5 | 543 | 2,651 |
| Example 50 | 4.86 | 10.4 | 5.7 | 543 | 2,534 |

Note:
[1]Density of sintered body,
Note:
[2]Volume resistivity,
Note:
[3]Average crystal grain size,
Note:
[4]Saturation magnetic flux density, and
Note:
[5]Initial permeability at 100 kHz and 0.4 A/m.

TABLE 4

| | Core loss Pcv (kW/m³) at 300 kHz and 100 mT | | | | | | |
|---|---|---|---|---|---|---|---|
| Sample No. | 20° C. | 40° C. | 60° C. | 80° C. | 100° C. | 120° C. | 140° C. |
| Comp. Ex. 1 | 331 | 302 | 282 | 271 | 282 | 320 | 394 |
| Comp. Ex. 2 | 254 | 289 | 297 | 334 | 401 | 506 | 651 |
| Example 1 | 218 | 232 | 241 | 264 | 309 | 382 | 474 |
| Example 2 | 205 | 221 | 228 | 251 | 295 | 366 | 466 |
| Example 3 | 196 | 214 | 223 | 244 | 288 | 358 | 457 |
| Example 4 | 217 | 218 | 217 | 228 | 261 | 316 | 393 |
| Example 5 | 246 | 233 | 223 | 230 | 261 | 310 | 378 |
| Example 6 | 286 | 290 | 279 | 281 | 300 | 351 | 433 |
| Example 7 | 271 | 283 | 279 | 283 | 313 | 371 | 458 |
| Example 8 | 232 | 243 | 245 | 256 | 291 | 348 | 429 |
| Example 9 | 224 | 239 | 249 | 264 | 309 | 375 | 469 |

TABLE 4-continued

| Sample No. | Core loss Pcv (kW/m³) at 300 kHz and 100 mT | | | | | | |
|---|---|---|---|---|---|---|---|
| | 20° C. | 40° C. | 60° C. | 80° C. | 100° C. | 120° C. | 140° C. |
| Example 10 | 193 | 213 | 230 | 255 | 305 | 368 | 454 |
| Comp. Ex. 3 | 374 | 435 | 492 | 557 | 636 | 729 | 833 |
| Example 11 | 226 | 225 | 225 | 242 | 279 | 345 | 436 |
| Example 12 | 253 | 261 | 261 | 277 | 314 | 373 | 461 |
| Example 13 | 254 | 257 | 255 | 270 | 307 | 371 | 462 |
| Example 14 | 232 | 234 | 229 | 240 | 275 | 327 | 409 |
| Example 15 | 235 | 242 | 237 | 252 | 282 | 340 | 426 |
| Example 16 | 242 | 242 | 232 | 242 | 277 | 339 | 431 |
| Example 17 | 236 | 237 | 223 | 228 | 259 | 313 | 394 |
| Example 18 | 238 | 234 | 228 | 235 | 272 | 331 | 423 |
| Example 19 | 254 | 249 | 239 | 247 | 280 | 344 | 442 |
| Example 20 | 235 | 226 | 214 | 223 | 253 | 305 | 387 |
| Example 21 | 238 | 231 | 221 | 230 | 265 | 326 | 416 |
| Example 22 | 222 | 223 | 217 | 230 | 263 | 322 | 411 |
| Example 23 | 237 | 237 | 231 | 241 | 272 | 327 | 410 |
| Example 24 | 243 | 239 | 231 | 241 | 278 | 342 | 433 |
| Example 25 | 252 | 243 | 232 | 239 | 269 | 326 | 408 |
| Example 26 | 235 | 230 | 224 | 237 | 274 | 338 | 427 |
| Example 27 | 235 | 251 | 256 | 272 | 313 | 377 | 471 |
| Example 28 | 234 | 249 | 254 | 275 | 320 | 390 | 491 |
| Example 29 | 225 | 226 | 226 | 245 | 289 | 353 | 438 |
| Example 30 | 225 | 225 | 225 | 240 | 276 | 336 | 412 |
| Example 31 | 228 | 227 | 224 | 234 | 266 | 317 | 389 |
| Example 32 | 229 | 227 | 224 | 237 | 274 | 333 | 405 |
| Example 33 | 220 | 221 | 220 | 231 | 264 | 318 | 392 |
| Example 34 | 243 | 245 | 239 | 251 | 286 | 340 | 434 |
| Example 35 | 235 | 228 | 226 | 241 | 280 | 336 | 405 |
| Example 36 | 238 | 230 | 226 | 238 | 275 | 328 | 394 |
| Example 37 | 244 | 235 | 226 | 232 | 261 | 307 | 367 |
| Example 38 | 242 | 233 | 226 | 236 | 268 | 320 | 388 |
| Example 39 | 244 | 235 | 227 | 237 | 268 | 317 | 384 |
| Example 40 | 246 | 239 | 230 | 234 | 261 | 304 | 378 |
| Example 41 | 207 | 221 | 226 | 248 | 290 | 348 | 429 |
| Example 42 | 226 | 245 | 248 | 268 | 307 | 365 | 443 |
| Comp. Ex. 4 | 412 | 403 | 382 | 394 | 434 | 484 | 549 |
| Example 43 | 214 | 227 | 233 | 250 | 285 | 344 | 431 |
| Example 44 | 223 | 244 | 241 | 256 | 292 | 343 | 426 |
| Comp. Ex. 5 | 312 | 327 | 315 | 326 | 362 | 416 | 491 |
| Example 45 | 202 | 206 | 206 | 221 | 254 | 304 | 369 |
| Example 46 | 214 | 215 | 211 | 220 | 248 | 297 | 363 |
| Example 47 | 292 | 286 | 269 | 264 | 291 | 337 | 399 |
| Comp. Ex. 6 | 160 | 213 | 296 | 400 | 567 | 818 | 1,017 |
| Comp. Ex. 7 | 346 | 430 | 575 | 868 | 1,150 | 1,356 | 1,456 |
| Comp. Ex. 8 | 461 | 379 | 304 | 252 | 242 | 285 | 379 |
| Example 48 | 239 | 250 | 242 | 238 | 250 | 282 | 348 |
| Example 49 | 194 | 222 | 233 | 240 | 255 | 287 | 346 |
| Example 50 | 203 | 197 | 220 | 237 | 258 | 289 | 346 |

TABLE 5

| Sample No. | Core loss Pcv (kW/m³) at 500 kHz and 100 mT | | | | | | |
|---|---|---|---|---|---|---|---|
| | 20° C. | 40° C. | 60° C. | 80° C. | 100° C. | 120° C. | 140° C. |
| Comp. Ex. 1 | 752 | 725 | 726 | 745 | 800 | 910 | 1,103 |
| Comp. Ex. 2 | 547 | 631 | 670 | 778 | 957 | 1,242 | 1,646 |
| Example 1 | 533 | 583 | 635 | 717 | 844 | 1,037 | 1,302 |
| Example 2 | 503 | 554 | 596 | 666 | 788 | 989 | 1,282 |
| Example 3 | 481 | 533 | 574 | 642 | 761 | 959 | 1,243 |
| Example 4 | 546 | 573 | 594 | 643 | 745 | 912 | 1,141 |
| Example 5 | 628 | 627 | 628 | 672 | 773 | 934 | 1,152 |
| Example 6 | 600 | 623 | 635 | 673 | 750 | 892 | 1,119 |
| Example 7 | 567 | 607 | 630 | 670 | 764 | 921 | 1,176 |
| Example 8 | 508 | 552 | 582 | 629 | 727 | 889 | 1,129 |
| Example 9 | 491 | 539 | 581 | 642 | 760 | 952 | 1,230 |
| Example 10 | 444 | 503 | 558 | 629 | 758 | 948 | 1,195 |
| Comp. Ex. 3 | 774 | 902 | 1,041 | 1,205 | 1,416 | 1,669 | 1,955 |
| Example 11 | 545 | 568 | 603 | 667 | 783 | 979 | 1,254 |
| Example 12 | 557 | 595 | 633 | 707 | 821 | 998 | 1,255 |
| Example 13 | 584 | 618 | 656 | 728 | 850 | 1,043 | 1,300 |
| Example 14 | 531 | 562 | 589 | 650 | 751 | 906 | 1,146 |
| Example 15 | 533 | 565 | 591 | 648 | 752 | 921 | 1,187 |
| Example 16 | 561 | 583 | 606 | 666 | 773 | 952 | 1,229 |
| Example 17 | 554 | 570 | 588 | 634 | 727 | 880 | 1,122 |
| Example 18 | 572 | 589 | 610 | 669 | 778 | 956 | 1,226 |
| Example 19 | 599 | 615 | 634 | 693 | 802 | 990 | 1,278 |

TABLE 5-continued

| Sample No. | Core loss Pcv (kW/m³) at 500 kHz and 100 mT | | | | | | |
|---|---|---|---|---|---|---|---|
| | 20° C. | 40° C. | 60° C. | 80° C. | 100° C. | 120° C. | 140° C. |
| Example 20 | 575 | 590 | 603 | 650 | 745 | 911 | 1,172 |
| Example 21 | 575 | 587 | 606 | 659 | 767 | 952 | 1,244 |
| Example 22 | 551 | 574 | 596 | 652 | 757 | 945 | 1,223 |
| Example 23 | 541 | 567 | 590 | 647 | 747 | 912 | 1,149 |
| Example 24 | 587 | 605 | 630 | 691 | 808 | 1,006 | 1,272 |
| Example 25 | 592 | 603 | 625 | 682 | 785 | 953 | 1,190 |
| Example 26 | 580 | 599 | 624 | 685 | 804 | 999 | 1,278 |
| Example 27 | 521 | 568 | 603 | 663 | 784 | 976 | 1,253 |
| Example 28 | 529 | 577 | 613 | 685 | 818 | 1,025 | 1,330 |
| Example 29 | 566 | 593 | 626 | 698 | 828 | 1,033 | 1,303 |
| Example 30 | 578 | 597 | 624 | 690 | 809 | 995 | 1,239 |
| Example 31 | 551 | 570 | 590 | 642 | 740 | 899 | 1,128 |
| Example 32 | 576 | 597 | 624 | 685 | 802 | 990 | 1,239 |
| Example 33 | 544 | 567 | 590 | 644 | 750 | 922 | 1,164 |
| Example 34 | 560 | 586 | 609 | 669 | 778 | 954 | 1,214 |
| Example 35 | 619 | 634 | 654 | 714 | 843 | 1,027 | 1,256 |
| Example 36 | 632 | 640 | 654 | 711 | 832 | 1,010 | 1,221 |
| Example 37 | 617 | 621 | 628 | 665 | 766 | 919 | 1,118 |
| Example 38 | 635 | 644 | 652 | 703 | 817 | 993 | 1,210 |
| Example 39 | 622 | 631 | 642 | 690 | 802 | 970 | 1,195 |
| Example 40 | 604 | 618 | 629 | 670 | 763 | 908 | 1,126 |
| Example 41 | 473 | 518 | 553 | 620 | 735 | 908 | 1,154 |
| Example 42 | 485 | 533 | 567 | 626 | 726 | 884 | 1,123 |
| Comp. Ex. 4 | 784 | 782 | 768 | 813 | 909 | 1,049 | 1,255 |
| Example 43 | 486 | 525 | 557 | 618 | 724 | 904 | 1,166 |
| Example 44 | 484 | 531 | 556 | 613 | 707 | 860 | 1,109 |
| Comp. Ex. 5 | 621 | 651 | 663 | 708 | 806 | 954 | 1,187 |
| Example 45 | 507 | 535 | 560 | 614 | 715 | 867 | 1,084 |
| Example 46 | 524 | 548 | 567 | 612 | 702 | 858 | 1,074 |
| Example 47 | 629 | 640 | 636 | 657 | 737 | 875 | 1,077 |
| Comp. Ex. 6 | 427 | 534 | 736 | 1,117 | 1,773 | 2,877 | 3,130 |
| Comp. Ex. 7 | 784 | 1,020 | 1,571 | 2,898 | 3,474 | 3,741 | 3,823 |
| Comp. Ex. 8 | 947 | 822 | 725 | 688 | 707 | 851 | 1,184 |
| Example 48 | 574 | 613 | 624 | 649 | 706 | 817 | 1,036 |
| Example 49 | 510 | 586 | 631 | 674 | 739 | 847 | 1,043 |
| Example 50 | 493 | 522 | 591 | 649 | 723 | 825 | 1,005 |

As is clear from Tables 3-5, all of the sintered MnZn ferrite bodies of Examples 1-50 have an initial permeability μi of at least 1800, and low core loss in a wide temperature range at any frequency of 300 kHz and 500 kHz. On the other hand, the sintered MnZn ferrite bodies of Comparative Examples 1-8 have high core loss at 300 KHz or 500 KHz. From the above results, it can be found that according to the present invention, a sintered MnZn ferrite body with low core loss from low temperature (20° C.) to high temperature (100° C.) can be obtained.

Examples 51-53 and Comparative Examples 9-11

The sintered MnZn ferrite bodies were produced in the same manner as in Example 1 except that the composition shown in Table 6 and the production conditions shown in Table 7 were used. The density, volume resistivity ρ, average crystal grain size, initial permeability μi, and core loss Pcv were measured in the same manner as in Example 1 for each sintered MnZn ferrite body. The core loss Pcv was measured at a frequency of 300 kHz and an exciting magnetic flux density of 100 mT. The results are shown in Tables 8-10.

Moreover, the magnetic core of each sintered MnZn ferrite body was kept at 200° C. in a temperature chamber for 96 hours, then taken out from the temperature chamber to be lowered the temperature of the magnetic core to room temperature, and the core loss was measured at 20° C., 40° C., 60° C., 80° C., 100° C., 120° C. and 140° C. under the same conditions as mentioned above. The core loss change ratio Ps was calculated from the core loss before and after keeping in a high temperature environment (200° C.) by the following formula (1).

$$Ps(\%) = [(PcvB - PcvA)/PcvA] \times 100 \qquad (1),$$

wherein PcvA is core loss of the magnetic core before keeping at high temperature (200° C.) and PcvB is core loss of the magnetic core after keeping at high temperature (200° C.).

For example, when the core loss change ratio Ps at 100° C. due to keeping in a high temperature environment (200° C.) is determined, core loss (Pcv100A) of the magnetic core measured at 100° C. at a frequency of 300 kHz and an exciting magnetic flux density of 100 mT before keeping at high temperature (200° C.) is used as PcvA, and core loss (Pcv100B) measured at 100° C. at a frequency of 300 kHz and an exciting magnetic flux density of 100 mT after keeping at high temperature (200° C.) is used as PcvB.

In the measurement of the core loss before keeping at high temperature, the magnetic core was left in the temperature chamber of the atmosphere of 140° C. for about 10-15 minutes until the temperature is stabilized, however, the temporal change of the magnetic properties did not substantially occur.

TABLE 6

| Sample No. | Composition | | | | | | | |
|---|---|---|---|---|---|---|---|---|
| | Main Components (% by mol) | | | Sub-Components (parts by mass) | | | | |
| | $Fe_2O_3$ | ZnO | MnO | $CaCO_3$ | $SiO_2$ | $ZrO_2$ | $Ta_2O_5$ | $Co_3O_4$ |
| Comp. Ex. 9 | 53.49 | 9.26 | Bal. | 0.12 | 0.006 | 0 | 0.02 | 0.33 |
| Comp. Ex. 10 | 53.49 | 9.26 | Bal. | 0.12 | 0.006 | 0.015 | 0.02 | 0.33 |
| Example 51 | 53.49 | 9.26 | Bal. | 0.12 | 0.006 | 0.03 | 0.02 | 0.33 |

TABLE 6-continued

| Sample No. | Main Components (% by mol) | | | Sub-Components (parts by mass) | | | | |
|---|---|---|---|---|---|---|---|---|
| | $Fe_2O_3$ | ZnO | MnO | $CaCO_3$ | $SiO_2$ | $ZrO_2$ | $Ta_2O_5$ | $Co_3O_4$ |
| Example 52 | 53.49 | 9.26 | Bal. | 0.12 | 0.006 | 0.06 | 0.02 | 0.33 |
| Example 53 | 53.49 | 9.26 | Bal. | 0.12 | 0.006 | 0.10 | 0.02 | 0.33 |
| Comp. Ex. 3* | 53.49 | 9.26 | Bal. | 0.12 | 0.006 | 0.15 | 0.02 | 0.33 |
| Comp. Ex. 11 | 53.49 | 9.26 | Bal. | 0.12 | 0.006 | 0.20 | 0.02 | 0.33 |

Note:
*The data of Comparative Example 3 is shown for comparison.

TABLE 7

| Sample No. | Production Conditions | | | |
|---|---|---|---|---|
| | Pulverizing Time (hours) | Pulverizing Time (hours) | High-Temperature-Keeping Step | |
| | | | Keeping Temperature (° C.) | Oxygen Concentration (%)[1] |
| Comp. Ex. 9 | 7 | 1.20 | 1190 | 0.2 |
| Comp. Ex. 10 | 7 | 1.20 | 1190 | 0.2 |
| Example 51 | 7 | 1.20 | 1190 | 0.2 |
| Example 52 | 7 | 1.20 | 1190 | 0.2 |
| Example 53 | 7 | 1.20 | 1190 | 0.2 |
| Comp. Ex. 3* | 7 | 1.20 | 1190 | 0.2 |
| Comp. Ex. 11 | 7 | 1.20 | 1190 | 0.2 |

Note:
*The data of Comparative Example 3 is shown for comparison.
Note:
[1]Oxygen concentration (% by volume) in the atmosphere in the high-temperature-keeping step.

TABLE 8

| Sample No. | Properties | | | |
|---|---|---|---|---|
| | $D^{(1)}$ (g/cm³) | $\rho^{(2)}$ (Ω·m) | $Dav^{(3)}$ (μm) | $\mu i^{(4)}$ |
| Comp. Ex. 9 | 4.77 | 5.4 | 6.6 | 2713 |
| Comp. Ex. 10 | 4.79 | 10.2 | 6.4 | 2615 |
| Example 51 | 4.81 | 14.3 | 6.5 | 2420 |
| Example 52 | 4.83 | 15.0 | 6.4 | 2376 |
| Example 53 | 4.86 | 10.3 | 5.9 | 2173 |
| Comp. Ex. 3* | 4.87 | 4.2 | 5.9 | 1635 |
| Comp. Ex. 11 | 4.86 | 2.1 | 6.3 | 1966 |

Note:
*The data of Comparative Example 3 is shown for comparison.
Note:
[1]Density of sintered body,
Note:
[2]Volume resistivity,
Note:
[3]Average crystal grain size, and
Note:
[4]Initial permeability at 100 kHz and 0.4 A/m.

TABLE 9

| Sample No. | Core loss Pcv (kW/m³) at 300 kHz and 100 mT before High-Temperature-Keeping | | | | | | |
|---|---|---|---|---|---|---|---|
| | 20° C. | 40° C. | 60° C. | 80° C. | 100° C. | 120° C. | 140° C. |
| Comp. Ex. 9 | 251 | 245 | 265 | 303 | 352 | 391 | 482 |
| Comp. Ex. 10 | 234 | 228 | 248 | 284 | 332 | 380 | 468 |
| Example 51 | 188 | 177 | 194 | 220 | 251 | 295 | 375 |
| Example 52 | 215 | 193 | 210 | 241 | 281 | 336 | 410 |
| Example 53 | 233 | 223 | 246 | 277 | 317 | 372 | 441 |
| Comp. Ex. 3* | 374 | 435 | 492 | 557 | 636 | 729 | 833 |
| Comp. Ex. 11 | 391 | 437 | 502 | 588 | 712 | 869 | 1040 |

Note:
*The data of Comparative Example 3 is shown for comparison.

TABLE 10

| Sample No. | Core loss Pcv (kW/m³) at 300 kHz and 100 mT after High-Temperature-Keeping | | | | | | |
|---|---|---|---|---|---|---|---|
| | 20° C. | 40° C. | 60° C. | 80° C. | 100° C. | 120° C. | 140° C. |
| Comp. Ex. 9 | 276 | 269 | 296 | 336 | 390 | 433 | 526 |
| Comp. Ex. 10 | 254 | 248 | 274 | 313 | 362 | 415 | 506 |
| Example 51 | 193 | 182 | 204 | 229 | 260 | 305 | 384 |
| Example 52 | 219 | 197 | 218 | 248 | 288 | 345 | 415 |
| Example 53 | 235 | 225 | 247 | 278 | 318 | 371 | 438 |
| Comp. Ex. 3* | 380 | 444 | 497 | 557 | 638 | 727 | 835 |
| Comp. Ex. 11 | 393 | 443 | 504 | 588 | 714 | 862 | 1041 |

Note:
*The data of Comparative Example 3 is shown for comparison.

TABLE 11

| Sample No. | Core loss Change Ratio Ps (%) | | | | | | |
|---|---|---|---|---|---|---|---|
| | 20° C. | 40° C. | 60° C. | 80° C. | 100° C. | 120° C. | 140° C. |
| Comp. Ex. 9 | 9.1 | 8.9 | 10.5 | 9.8 | 9.7 | 9.7 | 8.4 |
| Comp. Ex. 10 | 7.9 | 8.1 | 9.5 | 9.3 | 8.3 | 8.4 | 7.5 |
| Example 51 | 2.6 | 2.7 | 4.9 | 3.9 | 3.5 | 3.3 | 2.3 |
| Example 52 | 1.8 | 2.0 | 3.7 | 2.8 | 2.4 | 2.6 | 1.2 |
| Example 53 | 0.9 | 0.9 | 0.4 | 0.4 | 0.3 | −0.3 | −0.7 |
| Comp. Ex. 3* | 1.6 | 2.0 | 1.0 | 0.0 | 0.3 | −0.3 | 0.2 |
| Comp. Ex. 11 | 0.5 | 1.4 | 0.4 | 0.0 | 0.3 | −0.8 | 0.1 |

Note:
*The data of Comparative Example 3 is shown for comparison.

As is clear from Tables 8-11, all of the sintered MnZn ferrite bodies of Examples 51-53 had low core loss in a wide temperature range and small core loss change ratio Ps, because the initial permeability μi and volume resistivity were high. On the other hand, the sintered MnZn ferrite body of Comparative Example 9 had high initial permeability pi, but had low volume resistivity, thus, the core loss was high and the core loss change ratio Ps was also large. The sintered MnZn ferrite body of Comparative Example 10 had high volume resistivity and also had high initial permeability pi, thus, the core loss was high and the core loss change ratio Ps was also large. Moreover, since the sintered MnZn ferrite bodies of Comparative Examples 3 and 11 had low volume resistivity and low initial permeability the core loss change ratio Ps was small but the core loss was high. From the above results, it can be found that according to the present invention, a sintered MnZn ferrite body with low core loss from low temperature (20° C.) to high temperature (100° C.) can be obtained.

What is claimed is:

1. A sintered MnZn ferrite body containing
main components comprising 53.30-53.80% by mol of Fe calculated as $Fe_2O_3$, 6.90-9.50% by mol Zn calculated as ZnO, and the balance of Mn calculated as MnO, and sub-components comprising 0.003-0.020 parts by mass of Si calculated as $SiO_2$, more than 0 parts and 0.35 parts or less by mass of Ca calculated as $CaCO_3$, 0.30-0.50 parts by mass of Co calculated as $Co_3O_4$, 0.03-0.10 parts by mass of Zr calculated as $ZrO_2$, and 0-0.05 parts by mass of Ta calculated as $Ta_2O_5$, pre 100 parts by mass in total of the main components (calculated as the oxides), and having an average crystal grain size of 3 μm or more and less than 8 μm, and a density of 4.65 g/cm³ or more.

2. The sintered MnZn ferrite body according to claim 1, wherein the content of Ta is 0.01 parts or more by mass calculated as $Ta_2O_5$.

3. The sintered MnZn ferrite body according to claim 1, wherein the content of Fe is 53.40-53.70% by mol calculated as $Fe_2O_3$, the content of Zn is 7.00-9.40% by mol calculated as ZnO, and the content of Si is 0.004-0.015 parts by mass calculated as $SiO_2$, the content of Co is 0.30-0.45 parts by mass calculated as $Co_3O_4$, and the content of Zr is 0.05-0.09 parts by mass calculated as $ZrO_2$.

4. The sintered MnZn ferrite body according to claim 1, wherein core loss Pcv20 is 300 kW/m³ or less at 20° C. at a frequency of 300 kHz and an exciting magnetic flux density of 100 mT, and core loss Pcv100 is 320 kW/m³ or less at 100° C. at a frequency of 300 kHz and an exciting magnetic flux density of 100 mT, and core loss Pcv20 is 650 kW/m³ or less at 20° C. at a frequency of 500 kHz and exciting magnetic flux density at 100 mT, and core loss Pcv100 is 850 kW/m³ or less at 100° C. at a frequency of 500 kHz and exciting magnetic flux density at 100 mT.

5. The sintered MnZn ferrite body according to claim 1, wherein a core loss change ratio Ps represented by the following formula (1):

$$Ps(\%)=[(Pcv100B-Pcv100A)/Pcv100A]\times 100 \qquad (1),$$

is 5% or less, wherein Pcv100A is core loss at 100° C. before keeping at 200° C., and Pcv100B is core loss at 100° C. after keeping at 200° C. for 96 hours, and both are those measured at a frequency of 300 kHz and maximum magnetic flux density of 100 mT.

* * * * *